(12) United States Patent
Takatsu et al.

(10) Patent No.: US 10,232,725 B2
(45) Date of Patent: Mar. 19, 2019

(54) ELECTRIC POWER SUPPLY SYSTEM PROGRAM, ELECTRIC POWER SUPPLY DEVICE, PARKING DEVICE PROGRAM, AND PARKING DEVICE FOR SUPPLYING ELECTRIC POWER USING PAIRING INFORMATION

(71) Applicant: IHI CORPORATION, Tokyo (JP)

(72) Inventors: Yuji Takatsu, Tokyo (JP); Sho Hashizume, Tokyo (JP); Susumu Tokura, Tokyo (JP); Akio Ueda, Tokyo (JP); Kei Akune, Tokyo (JP); Tooru Hayashi, Tokyo (JP)

(73) Assignee: IHI Corporation, Tokyo (JP)

(*) Notice: Subject to any disclaimer, the term of this patent is extended or adjusted under 35 U.S.C. 154(b) by 182 days.

(21) Appl. No.: 15/263,563

(22) Filed: Sep. 13, 2016

(65) Prior Publication Data

US 2016/0375784 A1   Dec. 29, 2016

Related U.S. Application Data

(63) Continuation of application No. PCT/JP2015/057564, filed on Mar. 13, 2015.

(30) Foreign Application Priority Data

Mar. 13, 2014   (JP) ................................ 2014-050731

(51) Int. Cl.
| | |
|---|---|
| H01M 10/46 | (2006.01) |
| B60L 11/18 | (2006.01) |
| H02J 50/12 | (2016.01) |
| H02J 7/02 | (2016.01) |
| H02J 50/80 | (2016.01) |

(Continued)

(52) U.S. Cl.
CPC ......... *B60L 11/1846* (2013.01); *B60L 11/182* (2013.01); *E04H 6/245* (2013.01);
(Continued)

(58) Field of Classification Search
CPC ......... H02J 7/0018; H02J 7/0042; H02J 7/355
(Continued)

(56) References Cited

U.S. PATENT DOCUMENTS

| | | |
|---|---|---|
| 8,035,255 B2 | 10/2011 | Kurs et al. |
| 8,106,539 B2 | 1/2012 | Schatz et al. |

(Continued)

FOREIGN PATENT DOCUMENTS

| | | |
|---|---|---|
| CN | 101764434 A | 6/2010 |
| CN | 102648110 A | 8/2012 |

(Continued)

*Primary Examiner* — Edward Tso
(74) *Attorney, Agent, or Firm* — Volpe and Koenig, P.C.

(57) ABSTRACT

An electric power supply system program causes a control apparatus capable of controlling an electric power supply system to realize: a pairing information generating function to generate, when receiving an electric power supply request, specific pairing information that is pairing information; a pairing information transmitting function to transmit the specific pairing information to an object that has output the electric power supply request; a pairing information receiving function to receive the pairing information from the object by communication with the object located in the electric power supply space; and an electric power supply function to supply electric power to the object located in the electric power supply space when the received pairing information coincides with the specific pairing information.

3 Claims, 6 Drawing Sheets

(51) Int. Cl.
*H02J 50/40* (2016.01)
*E04H 6/24* (2006.01)
*E04H 6/14* (2006.01)

(52) U.S. Cl.
CPC .............. *H02J 7/025* (2013.01); *H02J 50/12* (2016.02); *H02J 50/40* (2016.02); *H02J 50/80* (2016.02); *B60L 2270/32* (2013.01); *E04H 6/14* (2013.01)

(58) Field of Classification Search
USPC ........ 320/104, 109, 116; 414/277, 228, 232, 414/268, 270, 281; 701/29.6
See application file for complete search history.

(56) References Cited

U.S. PATENT DOCUMENTS

| | | | |
|---|---|---|---|
| 2010/0161217 A1 | 6/2010 | Yamamoto | |
| 2012/0206098 A1 | 8/2012 | Kim | |
| 2014/0012448 A1* | 1/2014 | Tripathi | G05D 1/0276 701/22 |
| 2014/0035526 A1* | 2/2014 | Tripathi | B60L 11/1838 320/109 |
| 2014/0074332 A1* | 3/2014 | Ichikawa | B60L 11/1846 701/22 |
| 2015/0115704 A1* | 4/2015 | Gorai | H02J 50/12 307/104 |
| 2015/0165923 A1 | 6/2015 | Hirayama et al. | |

FOREIGN PATENT DOCUMENTS

| | | |
|---|---|---|
| EP | 2692966 A1 | 2/2014 |
| JP | 2011-060260 A | 3/2011 |
| JP | 2011-097814 A | 5/2011 |
| JP | 2013-233027 A | 11/2013 |
| JP | 2014-027777 A | 2/2014 |
| WO | 2013168281 A1 | 11/2013 |
| WO | 2014010447 A1 | 1/2014 |

* cited by examiner

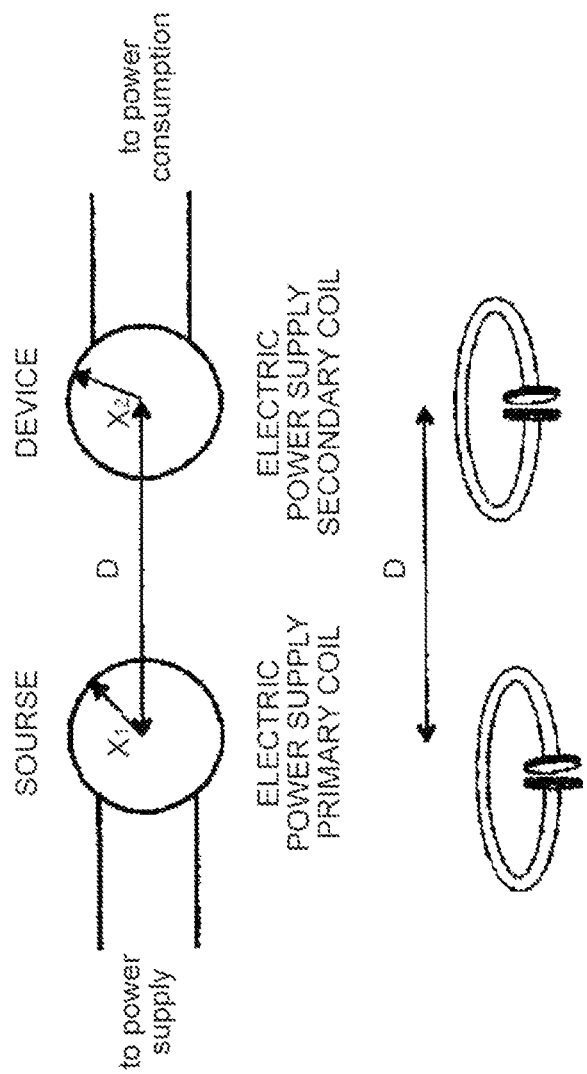

ELECTRIC POWER SUPPLY SYSTEM PROGRAM, ELECTRIC POWER SUPPLY DEVICE, PARKING DEVICE PROGRAM, AND PARKING DEVICE FOR SUPPLYING ELECTRIC POWER USING PAIRING INFORMATION

CROSS-REFERENCE TO RELATED APPLICATIONS

This application is a continuation application of International Application No. PCT/JP2015/057564, filed Mar. 13, 2015, which claims priority to Japanese Patent Application No. 2014-050731 filed Mar. 13, 2014. The contents of these applications are incorporated herein by reference in their entirety.

TECHNICAL FIELD

The present disclosure relates to an electric power supply system program, an electric power supply device, a parking device program, and a parking device. The present disclosure relates to the electric power supply system program, the electric power supply device, the parking device program, and the parking device which are especially suitable for wireless power transfer.

BACKGROUND ART

In recent years, vehicles driven by electric power have been used.

This leads to a need for supplying electric power to a vehicle.

For example, electric power is supplied to a parked vehicle by an electric power supply apparatus.

The electric power supply apparatus is capable of supplying electric power to a vehicle wirelessly.

For example, such an idea has been studied that a vehicle has a wireless type electric power supply secondary coil on a bottom part thereof, and an electric power supply primary coil is provided below the vehicle to supply electric power to the vehicle.

FIGS. 6A and 6B are conceptual diagrams of a wireless power transfer system.

The concept illustrated in FIGS. 6A and 6B has been disclosed in U.S. Pat. No. 8,035,255.

When the wireless type power transfer is employed, it is desired that electric power is supplied with a small energy loss from the electric power supply primary coil to the electric power supply secondary coil.

Furthermore, when the wireless type power transfer is employed to supply electric power from the electric power supply primary coil to the electric power supply secondary coil, it is desired that usage is easy.

In the wireless power transfer system, electric power is supplied wirelessly from the electric power supply primary coil to the electric power supply secondary coil via a magnetic field formed in a space between the electric power supply primary coil and the electric power supply secondary coil.

This feature imposes a reasonable restriction on a distance and a misalignment between the electric power supply primary coil and the electric power supply secondary coil. An attempt to supply electric power while exceeding the restriction of distance and misalignment leads to failure, that is, a large energy loss.

CITATION LIST

Patent Literatures

Patent Literature 1: Japanese Unexamined Patent Publication No. 2011-60260
Patent Literature 2: Japanese Unexamined Patent Publication No. 2011-97814
Patent Literature 3: U.S. Pat. No. 8,035,255
Patent Literature 4: U.S. Pat. No. 8,106,539

SUMMARY

Technical Problem

When a vehicle is about to enter a designated electric power supply space, the vehicle might enter a parking space which is different from the designated electric power supply space.

In this case, electric power cannot be supplied to the vehicle even when an electric power supply apparatus provided in the designated electric power supply space executes an electric power supply process.

In a case where an electric power supply method is wireless power transfer, and when the designated electric power supply space is close to the electric power supply space that the vehicle has entered, wireless power transfer might be executed very inefficiently.

The present disclosure describes an electric power supply system program, an electric power supply device, a parking device program, and a parking device capable of appropriately supplying electric power using a simple structure.

Solution to Problem

In order to achieve the above-mentioned purpose, an aspect of the present disclosure is an electric power supply system program that supplies electric power to an object capable of receiving electric power supply, wherein the electric power supply system program causes a control apparatus capable of controlling an electric power supply system to realize: a pairing information generating function to generate, when receiving an electric power supply request, specific pairing information that is pairing information; a pairing information transmitting function to transmit the specific pairing information to an object that has output the electric power supply request; a pairing information receiving function to receive the pairing information from the object by communicating with the object located in the electric power supply space; and an electric power supply function to supply electric power to the object located in the electric power supply space when the received pairing information coincides with the specific pairing information.

Owing to the above-mentioned configuration, the control apparatus can control the electric power supply system. The electric power supply system program causes the control apparatus to realize the pairing information generating function, the pairing information transmitting function, the pairing information receiving function, and the electric power supply function. The pairing information generating function generates, when receiving the electric power supply request, the specific pairing information that is the pairing information. The pairing information transmitting function transmits the specific pairing information to the object that has output the electric power supply request. The pairing information receiving function receives the pairing information from the object by communicating with the object located in the electric power supply space. The electric power supply function supplies electric power to the object located in the electric power supply space when the received pairing information coincides with the specific pairing information.

As a result, electric power can be supplied, in the electric power supply space, to the object that has made the electric power supply request.

In order to achieve the above-mentioned purpose, an aspect of the present disclosure is an electric power supply system program that supplies electric power to an object capable of receiving electric power supply, wherein the electric power supply system program causes a control apparatus capable of controlling an electric power supply system to realize: a pairing information generating function to generate, upon receiving an electric power supply request, specific pairing information that is pairing information; and a pairing information transmitting function to transmit the specific pairing information to each of an electric power supply apparatus provided in the electric power supply space and an object that has output the electric power supply request, and the electric power supply system program causes the electric power supply apparatus provided in the electric power supply space to realize: a pairing information recording function to record the transmitted specific pairing information; a pairing information receiving function to receive the pairing information from the object by communicating with the object located in the electric power supply space; and an electric power supply function to supply electric power to the object located in the electric power supply space when the received pairing information coincides with the specific pairing information recorded in the electric power supply apparatus.

Owing to the above-mentioned configuration, the control apparatus can control the electric power supply system. The electric power supply system program causes the control apparatus to realize the pairing information generating function and the pairing information transmitting function. The pairing information generating function generates, upon receiving the electric power supply request, the specific pairing information that is the pairing information. The pairing information transmitting function transmits the specific pairing information to each of the electric power supply apparatus provided in the electric power supply space and the object that has output the electric power supply request. The electric power supply system program causes the electric power supply apparatus provided in the electric power supply space to realize the pairing information recording function, the pairing information receiving function, and the electric power supply function. The pairing information recording function records the transmitted specific pairing information. The pairing information receiving function receives the pairing information from the object by communicating with the object located in the electric power supply space. The electric power supply function supplies electric power to the object located in the electric power supply space when the received pairing information coincides with the specific pairing information recorded in the electric power supply apparatus.

As a result, electric power can be supplied, in the electric power supply space, to the object that has made the electric power supply request.

In order to achieve the above-mentioned purpose, an aspect of the present disclosure is an electric power supply device that supplies electric power to an object capable of receiving electric power supply, the electric power supply device including: a plurality of electric power supply spaces that are spaces in which a respective plurality of objects is located at the time of electric power supply; and an electric power supply apparatus capable of supplying electric power to the object located in the electric power supply space, wherein the electric power supply device is configured to: select, when receiving an electric power supply request, a specific electric power supply space that is a particular electric power supply space from among the plurality of electric power supply spaces to generate specific pairing information that is pairing information associated with the specific electric power supply space; transmit the specific pairing information to an object that has output the electric power supply request; receive the pairing information from the object by communicating with the object located in the specific electric power supply space; and supply, from the electric power supply apparatus, electric power to the object located in the specific electric power supply space when the received pairing information coincides with the specific pairing information associated with the specific electric power supply space.

Owing to the above-mentioned configuration, the plurality of electric power supply spaces is the spaces in which the respective plurality of objects is located at the time of electric power supply. The electric power supply apparatus can supply electric power to the object located in the electric power supply space. The electric power supply device selects, when receiving the electric power supply request, the specific electric power supply space that is the particular electric power supply space from among the plurality of electric power supply spaces to generate the specific pairing information that is the pairing information associated with the specific electric power supply space. The electric power supply device transmits the specific pairing information to the object that has output the electric power supply request. The electric power supply device receives the pairing information from the object by communicating with the object located in the specific electric power supply space. The electric power supply apparatus supplies electric power to the object located in the specific electric power supply space when the received pairing information coincides with the specific pairing information associated with the specific electric power supply space.

As a result, electric power can be supplied, in the particular electric power supply space, to the object that has made the electric power supply request.

In order to achieve the above-mentioned purpose, an aspect of the present disclosure is an electric power supply device that supplies electric power to an object capable of receiving electric power supply, the electric power supply device including: a plurality of electric power supply spaces that are spaces in which a respective plurality of objects is located at the time of electric power supply; and an electric power supply apparatus provided in at least one electric power supply space of the plurality of electric power supply spaces, the electric power supply apparatus being capable of supplying electric power to the object located in the electric power supply space, wherein the electric power supply device is configured to: select, upon receiving an electric power supply request, a specific electric power supply space that is a particular electric power supply space from among the plurality of electric power supply spaces to generate pairing information associated with the specific electric power supply space; transmit the pairing information to each of the electric power supply apparatus provided in the specific electric power supply space and an object that has output the electric power supply request; record, by the electric power supply apparatus provided in the specific electric power supply space, transmitted specific pairing information; communicate, by the electric power supply apparatus provided in the specific electric power supply space, with the object located in the specific electric power supply space to receive, by the electric power supply apparatus provided in the specific electric power supply space, the pairing information from the object; and supply, from the electric power supply apparatus provided in the specific electric power supply space, electric power to the object located in the specific electric power supply space when the received pairing information coincides with the specific pairing information recorded in the electric power supply apparatus provided in the specific electric power supply space.

Owing to the above-mentioned configuration, the plurality of electric power supply spaces is the spaces in which the respective plurality of objects is located at the time of electric power supply. The electric power supply apparatus is provided in at least one electric power supply space of the plurality of electric power supply spaces, and capable of supplying electric power to the object located in the electric power supply space. The electric power supply device selects, upon receiving the electric power supply request, the specific electric power supply space that is the particular electric power supply space from among the plurality of electric power supply spaces to generate the pairing information associated with the specific electric power supply space. The electric power supply device transmits the pairing information to each of the electric power supply apparatus provided in the specific electric power supply space and the object that has output the electric power supply request. The electric power supply apparatus provided in the specific electric power supply space records the transmitted specific pairing information. The object located in the specific electric power supply space and the electric power supply apparatus provided in the specific electric power supply space communicate with each other, and the electric power supply apparatus provided in the specific electric power supply space receives the pairing information from the object. The electric power supply apparatus provided in the specific electric power supply space supplies electric power to the object located in the specific electric power supply space when the received pairing information coincides with the specific pairing information recorded in the electric power supply apparatus provided in the specific electric power supply space.

As a result, electric power can be supplied, in the specific electric power supply space, to the object that has made the electric power supply request.

In order to achieve the above-mentioned purpose, an aspect of the present disclosure is a parking device program that supplies electric power to a vehicle capable of receiving electric power supply, wherein the parking device program causes a control apparatus capable of controlling a parking device to realize: a parking space selecting function to select, when receiving a parking request, a specific parking space that is a particular parking space from among a plurality of parking spaces; a pairing information generating function to generate, when receiving an electric power supply request, specific pairing information that is pairing information associated with the specific parking space; a pairing information transmitting function to transmit the specific pairing information to a vehicle that has output the electric power supply request; a pairing information receiving function to receive the pairing information from the vehicle by communicating with the vehicle parked in the specific parking space; and an electric power supply function to supply electric power to the vehicle parked in the specific parking space when the received pairing information coincides with the specific pairing information associated with the specific parking space.

Owing to the above-mentioned configuration, the control apparatus can control the parking device. The parking device program causes the control apparatus to realize the parking space selecting function, the pairing information generating function, the pairing information transmitting function, the pairing information receiving function, and the electric power supply function. The parking space selecting function selects, when receiving the parking request, the specific parking space that is the particular parking space from among the plurality of parking spaces. The pairing information generating function generates, when receiving the electric power supply request, the specific pairing information that is the pairing information associated with the specific parking space. The pairing information transmitting function transmits the specific pairing information to the vehicle that has output the electric power supply request. The pairing information receiving function receives the pairing information from the vehicle by communicating with the vehicle parked in the specific parking space. The electric power supply function supplies electric power to the vehicle parked in the specific parking space when the received pairing information coincides with the specific pairing information associated with the specific parking space.

As a result, electric power can be supplied, in a particular electric power supply space, to the vehicle that has made the electric power supply request.

In order to achieve the above-mentioned purpose, an aspect of the present disclosure is a parking device program that supplies electric power to a vehicle capable of receiving electric power supply, wherein the parking device program causes a control apparatus capable of controlling a parking device to realize: a parking space selecting function to select, upon receiving a parking request, a specific parking space that is a particular parking space from among a plurality of parking spaces; a pairing information generating function to generate, upon receiving a parking request, specific pairing information that is pairing information associated with the specific parking space; and a pairing information transmitting function to transmit the specific pairing information to each of an electric power supply apparatus provided in the specific parking space and a vehicle that has output an electric power supply request, and the parking device program causes the electric power supply apparatus provided in the parking space to realize: a pairing information recording function to record the transmitted specific pairing information; a pairing information receiving function to receive the pairing information from the vehicle by communicating with the vehicle parked in the parking space; and an electric power supply function to supply, from the electric power supply apparatus provided in the specific parking space, electric power to the vehicle parked in the specific parking space when the received pairing information coincides with the specific pairing information recorded in the electric power supply apparatus.

Owing to the above-mentioned configuration, the control apparatus can control the parking device. The parking device program causes the control apparatus to realize the parking space selecting function, the pairing information generating function, and the pairing information transmitting function. The parking space selecting function selects, upon receiving the parking request, the specific parking space that is the particular parking space from among the plurality of parking spaces. The pairing information generating function generates, upon receiving the electric power supply request, the specific pairing information that is the pairing information associated with the specific parking space. The pairing information transmitting function transmits the specific pairing information to each of the electric power supply apparatus provided in the specific parking space and the vehicle that has output the electric power supply request. The parking device program causes the electric power supply apparatus provided in the parking space to realize the pairing information recording function, the pairing information receiving function, and the electric power supply function. The pairing information recording function records the transmitted specific pairing information. The pairing information receiving function receives the pairing information from the vehicle by communicating with the vehicle parked in the parking space. The electric power supply function supplies, from the electric power supply apparatus provided in the specific parking space, electric power to the vehicle parked in the specific parking space when the received pairing information coincides with the specific pairing information recorded in the electric power supply apparatus.

As a result, electric power can be supplied, in a particular electric power supply space, to the vehicle that has made the electric power supply request.

In order to achieve the above-mentioned purpose, an aspect of the present disclosure is a parking device that causes a vehicle capable of receiving electric power supply to be parked, the parking device including: a plurality of parking spaces in which a respective plurality of vehicles is capable of being parked; and an electric power supply apparatus capable of supplying electric power to the vehicle located in the parking space, wherein the parking device is configured to: select, when receiving a parking request, a specific parking space that is a particular parking space from among the plurality of parking spaces; generate, when receiving an electric power supply request together with the parking request, specific pairing information that is pairing information associated with the specific parking space; transmit the specific pairing information to a vehicle that has output the electric power supply request; receive the pairing information from the vehicle by communicating with the vehicle parked in the specific parking space; and supply, from the electric power supply apparatus, electric power to the vehicle parked in the specific parking space when the received pairing information coincides with the specific pairing information associated with the specific parking space.

Owing to the above-mentioned configuration, the plurality of vehicles can be parked in the respective plurality of parking spaces. The electric power supply apparatus can supply electric power to the vehicle located in the parking space. The parking device selects, when receiving the parking request, the specific parking space that is the particular parking space from among the plurality of parking spaces. When the electric power supply request is received together with the parking request, the specific pairing information that is the pairing information associated with the specific parking space is generated. The parking device transmits the specific pairing information to the vehicle that has output the electric power supply request. The parking device receives the pairing information from the vehicle by communicating with the vehicle parked in the specific parking space. The electric power supply apparatus supplies electric power to the vehicle parked in the specific parking space when the received pairing information coincides with the specific pairing information associated with the specific parking space. As a result, electric power can be supplied, in a particular electric power supply space, to the vehicle that has made the electric power supply request.

In order to achieve the above-mentioned purpose, an aspect of the present disclosure is a parking device that causes a vehicle capable of receiving electric power supply to be parked, the parking device including: a plurality of parking spaces in which a respective plurality of vehicles is capable of being parked; and an electric power supply apparatus provided in at least one parking space of the plurality of parking spaces, the electric power supply apparatus being capable of supplying electric power to the vehicle located in the parking space, wherein the parking device is configured to: select, upon receiving a parking request, a specific parking space that is a particular parking space from among the plurality of parking spaces; generate, upon receiving an electric power supply request together with the parking request, pairing information associated with the specific parking space; transmit the pairing information to each of the electric power supply apparatus provided in the specific parking space and a vehicle that has output the electric power supply request; record, by the electric power supply apparatus provided in the specific parking space, transmitted specific pairing information; communicate, by the electric power supply apparatus provided in the specific parking space, with the vehicle parked in the specific parking space to receive, by the electric power supply apparatus provided in the specific parking space, the pairing information from the vehicle; and supply, from the electric power supply apparatus provided in the specific parking space, electric power to the vehicle parked in the specific parking space when the received pairing information coincides with the specific pairing information recorded in the electric power supply apparatus provided in the specific parking space.

Owing to the above-mentioned configuration, the plurality of vehicles can be parked in the respective plurality of parking spaces. The electric power supply apparatus is provided in at least one parking space of the plurality of parking spaces, and capable of supplying electric power to the vehicle located in the parking space. The parking device selects, upon receiving the parking request, the specific parking space that is the particular parking space from among the plurality of parking spaces. The parking device generates, upon receiving the electric power supply request together with the parking request, the pairing information associated with the specific parking space. The parking device transmits the pairing information to each of the electric power supply apparatus provided in the specific parking space and the vehicle that has output the electric power supply request. The electric power supply apparatus provided in the specific parking space records the transmitted specific pairing information. The vehicle parked in the specific parking space and the electric power supply apparatus provided in the specific parking space communicate with each other, and the electric power supply apparatus provided in the specific parking space receives the pairing information from the vehicle. The electric power supply apparatus provided in the specific parking space supplies electric power to the vehicle parked in the specific parking space when the received pairing information coincides with the specific pairing information recorded in the electric power supply apparatus provided in the specific parking space.

As a result, electric power can be supplied, in an electric power supply space, to the vehicle that has made the electric power supply request.

Effects of Disclosure

As described above, an electric power supply system program according to an aspect of the present disclosure has the following effects owing to its configuration.

Such a configuration has been employed as to: generate specific pairing information upon receiving an electric power supply request; transmit the specific pairing information to an object that has output the electric power supply request; receive pairing information from the object located in an electric power supply space; and supply electric power to the object located in the electric power supply space when the pairing information coincides with the specific pairing information. Therefore, electric power can be supplied, in the electric power supply space, to the object that has made the electric power supply request.

Such a configuration has been employed as to: generate specific pairing information upon receiving an electric power supply request; transmit the specific pairing information to an object that has output the electric power supply request and an electric power supply apparatus provided in an electric power supply space; receive pairing information from the object located in the electric power supply space; and supply, from the electric power supply apparatus provided in the electric power supply space, electric power to the object located in the electric power supply space when the pairing information coincides with the specific pairing information. Therefore, electric power can be supplied, in the electric power supply space, to a vehicle that has made the electric power supply request.

As described above, an electric power supply device according to an aspect of the present disclosure has the following effects owing to its configuration.

Such a configuration has been employed as to: select a specific electric power supply space upon receiving an electric power supply request to generate specific pairing information; transmit the specific pairing information to an object that has output the electric power supply request; receive pairing information from the object located in the specific electric power supply space; and supply electric power to the object located in the specific electric power supply space when the pairing information coincides with the specific pairing information. Therefore, electric power can be supplied, in a particular electric power supply space, to the object that has made the electric power supply request.

Such a configuration has been employed as to: select a specific electric power supply space upon receiving an electric power supply request to generate specific pairing information; transmit the specific pairing information to an object that has output the electric power supply request and an electric power supply apparatus provided in an electric power supply space; receive pairing information from the object located in the specific electric power supply space; and supply, from the electric power supply apparatus provided in the specific electric power supply space, electric power to the object located in the specific electric power supply space when the pairing information coincides with the specific pairing information. Therefore, electric power can be supplied, in the specific electric power supply space, to the object that has made the electric power supply request.

As described above, a parking device program according to an aspect of the present disclosure has the following effects owing to its configuration.

Such a configuration has been employed as to: select a specific parking space when receiving a parking request; generate specific pairing information upon receiving an electric power supply request; transmit the specific pairing information to a vehicle that has output the electric power supply request; receive pairing information from the vehicle located in the specific parking space; and supply electric power to the vehicle located in the specific parking space when the pairing information coincides with the specific pairing information. Therefore, electric power can be supplied, in a particular electric power supply space, to the vehicle that has made the electric power supply request.

Such a configuration has been employed as to: select a specific parking space when receiving a parking request; generate specific pairing information upon receiving an electric power supply request; transmit the specific pairing information to a vehicle that has output the electric power supply request and an electric power supply apparatus provided in the specific parking space; receive pairing information from the vehicle located in the specific parking space; and supply, from the electric power supply apparatus provided in the specific parking space, electric power to the vehicle located in the specific parking space when the pairing information coincides with the specific pairing information. Therefore, electric power can be supplied, in a particular electric power supply space, to the vehicle that has made the electric power supply request.

As described above, a parking device according to an aspect of the present disclosure has the following effects owing to its configuration.

Such a configuration has been employed as to: select a specific parking space when receiving a parking request; generate specific pairing information upon receiving an electric power supply request; transmit the specific pairing information to a vehicle that has output the electric power supply request; receive pairing information from the vehicle located in the specific parking space; and supply electric power to the vehicle located in the specific parking space when the pairing information coincides with the specific pairing information. Therefore, electric power can be supplied, in a particular electric power supply space, to the vehicle that has made the electric power supply request.

Such a configuration has been employed as to: select a specific parking space when receiving a parking request; generate specific pairing information upon receiving an electric power supply request; transmit the specific pairing information to a vehicle that has output the electric power supply request and an electric power supply apparatus provided in the specific parking space; receive pairing information from the vehicle located in the specific parking space; and supply, from the electric power supply apparatus provided in the specific parking space, electric power to the vehicle located in the specific parking space when the pairing information coincides with the specific pairing information. Therefore, electric power can be supplied, in an electric power supply space, to the vehicle that has made the electric power supply request.

Thus, it is possible to provide the electric power supply system program, the electric power supply device, the parking device program, and the parking device capable of appropriately supplying electric power using a simple structure.

BRIEF DESCRIPTION OF DRAWINGS

FIGS. 6A and 6B are conceptual diagrams of a wireless power transfer system.

DESCRIPTION OF EMBODIMENTS

Hereinafter, embodiments for practicing the present disclosure will be described with reference to the drawings.

To begin with, a wireless power transfer system according to an embodiment of the present disclosure will be described based on the drawings.

First, electric power supply system software or an electric power supply device according to an embodiment of the present disclosure will be described.

The electric power supply system software or the electric power supply device according to the embodiment of the present disclosure is software or a device for supplying electric power to an object capable of receiving electric power supply.

The electric power supply system software or the electric power supply device according to the embodiment of the present disclosure may be software or a device for supplying electric power wirelessly to an object capable of receiving electric power supply.

Hereinafter, an electric power supply primary coil and an electric power supply secondary coil for the wireless power transfer will be described based on the drawings.

Figure 1:
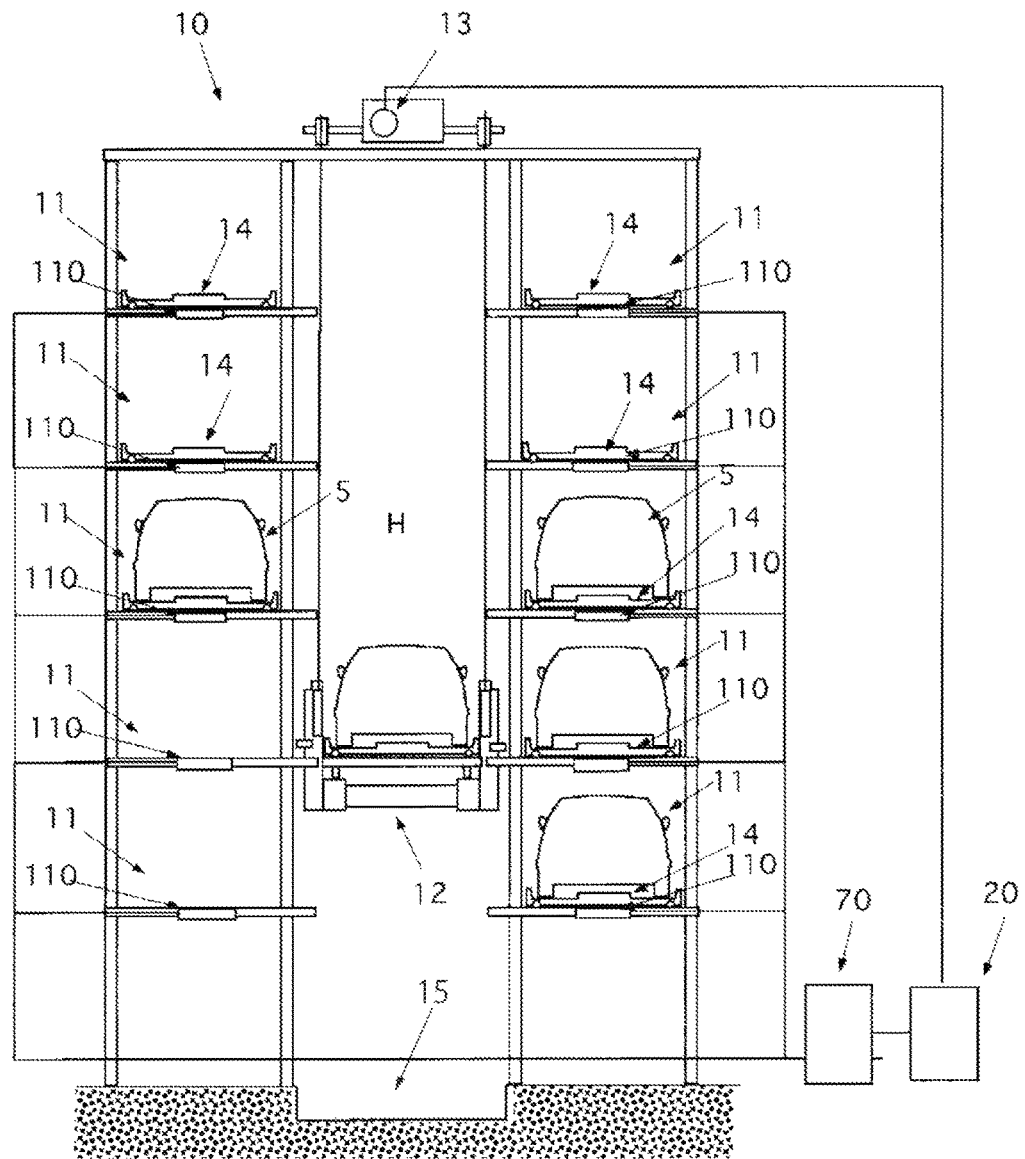
FIG. 1 is a conceptual view of an exemplary parking device according to an embodiment of the present disclosure.
Figure 2:
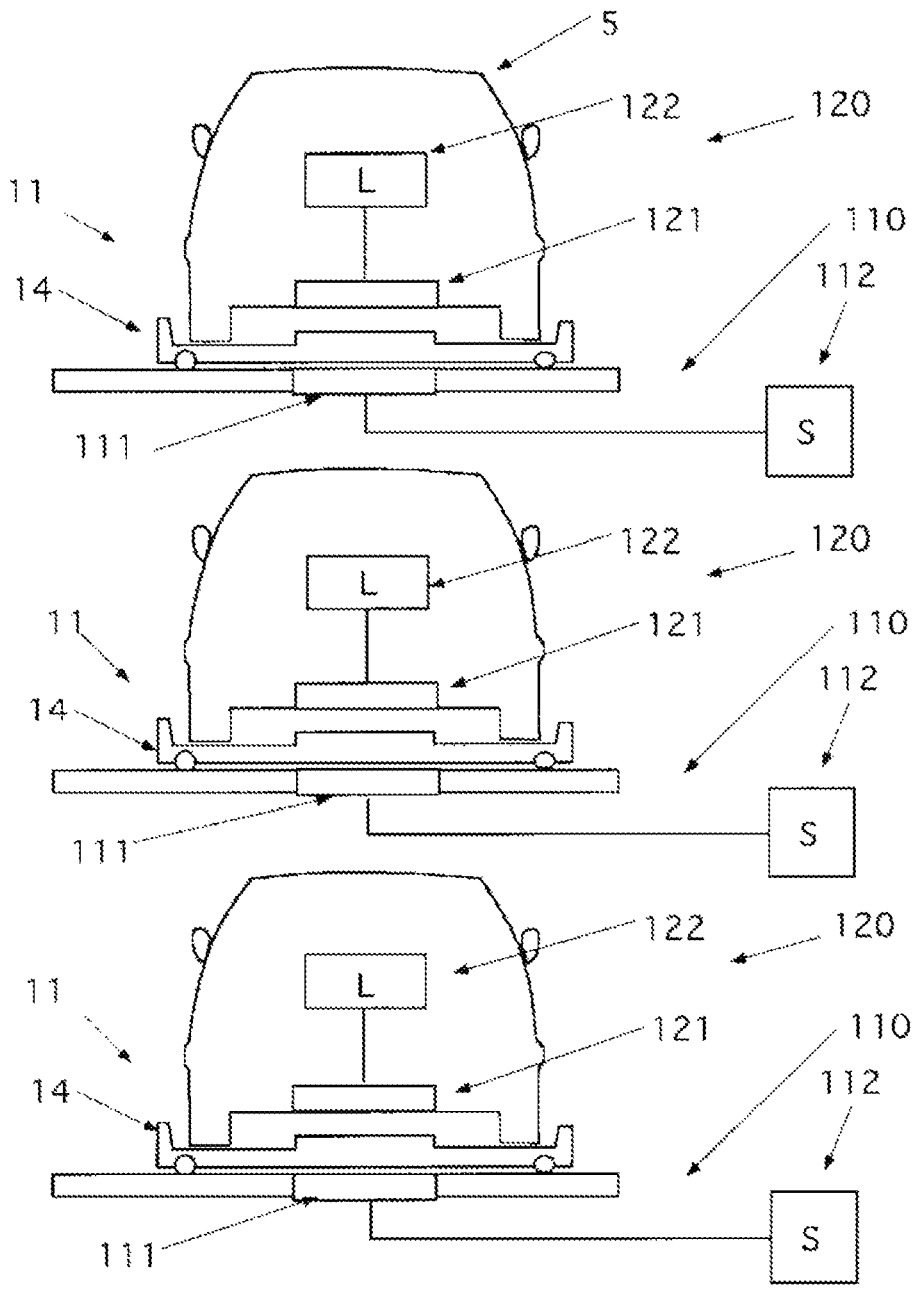
FIG. 2 is a partial conceptual view of the exemplary parking device according to the embodiment of the present disclosure.

FIG. 2 is a view illustrating an exemplary wireless power transfer system applied to a parking device.

The electric power supply primary coil 111 is a transmission side apparatus that can supplies electric power wirelessly to the electric power supply secondary coil 121.

An electric power supply apparatus 110 includes the electric power supply primary coil 111, a drive circuit 112, and an adjustment circuit (not illustrated).

The electric power supply primary coil 111 is a transmission side coil circuit that supplies electric power wirelessly.

The drive circuit 112 is an electric circuit that drives the electric power supply primary coil 111.

For example, the drive circuit 112 supplies AC electric power having a predetermined frequency of the electric power supply primary coil.

The adjustment circuit (not illustrated) is a circuit that adjusts electric and magnetic properties of the electric power supply apparatus 110.

For example, the adjustment circuit (not illustrated) adjusts an electromagnetic resonance frequency of the electric power supply apparatus 110.

The electric power supply primary coil is provided at a specific position that is at least one particular position.

An electric power receiving apparatus 120 is a reception side apparatus to which electric power is supplied wirelessly from the electric power supply primary coil.

The electric power receiving apparatus 120 includes the electric power supply secondary coil 121 and a load 122.

The electric power receiving apparatus 120 may include the electric power supply secondary coil 121, the load 122, and an adjustment circuit (not illustrated).

The electric power supply secondary coil 121 is a reception side coil circuit for enabling wireless power transfer.

The adjustment circuit (not illustrated) is a circuit that adjusts electric and magnetic properties of the electric power receiving apparatus 120.

For example, the adjustment circuit (not illustrated) adjusts an electromagnetic resonance frequency of the electric power receiving apparatus 120.

The electric power supply secondary coil 121 is incorporated in an object.

Electric power supplied wirelessly from the electric power supply primary coil 111 can be supplied to the electric power supply secondary coil 121.

When an electric current flows in the electric power supply primary coil 111, a magnetic field is generated in a space sandwiched between the electric power supply primary coil 111 and the electric power supply secondary coil 121, and the generated magnetic field causes an electric current of the electric power supply primary coil 111 to flow.

When a relative posture or position between the electric power supply primary coil 111 and the electric power supply secondary coil 121 is set to a predetermined posture or position, electric power can be efficiently supplied wirelessly from the electric power supply primary coil 111 to the electric power supply secondary coil 121 with a small energy loss.

First, electric power supply system software according to a first embodiment of the present disclosure will be described.

The electric power supply system software according to the first embodiment of the present disclosure is software for supplying electric power to an object capable of receiving electric power supply.

The electric power supply system software according to the first embodiment of the present disclosure causes a control apparatus to realize a pairing information generating function, a pairing information transmitting function, a pairing information receiving function, and an electric power supply function.

The electric power supply system software according to the first embodiment of the present disclosure may cause the control apparatus to realize the pairing information generating function, the pairing information transmitting function, an object moving function, the pairing information receiving function, and the electric power supply function.

The electric power supply system software according to the first embodiment of the present disclosure may cause the control apparatus to realize the pairing information generating function, the pairing information transmitting function, an object moving function, the pairing information receiving function, and the electric power supply function.

The control apparatus is an apparatus that controls an electric power supply system.

The control apparatus includes a CPU, a memory, an interface, and an input/output device.

The pairing information generating function is a function to generate, when receiving an electric power supply request, specific pairing information that is pairing information.

The control apparatus generates, when receiving the electric power supply request, the specific pairing information that is the pairing information.

The pairing information transmitting function is a function to transmit the specific pairing information to an object that has output the electric power supply request.

The control apparatus transmits the specific pairing information to the object that has output the electric power supply request.

The object records the specific pairing information.

The object moving function is a function to move the object to an electric power supply space.

For example, the control apparatus controls a moving apparatus to move the object to the electric power supply space.

The object moving function is a function to allow the object to move to the electric power supply space.

For example, the control apparatus designates the electric power supply space, and another means moves the object to the electric power supply space.

The pairing information receiving function is a function to communicate with the object located in the electric power supply space to receive the pairing information from the object.

For example, the object located in the electric power supply space attempts to communicate with the control apparatus.

The control apparatus receives the pairing information from the object by communicating with the object located in the electric power supply space.

The electric power supply function is a function to supply electric power to the object located in the electric power supply space when the received pairing information coincides with the specific pairing information.

The control apparatus supplies electric power to the object located in the electric power supply space when the received pairing information coincides with the specific pairing information.

For example, the control apparatus does not supply electric power to the object located in the electric power supply space when the received pairing information does not coincide with the specific pairing information.

For example, the control apparatus does not supply electric power to the object located in the electric power supply space when the received pairing information cannot be received.

Next, electric power supply system software according to a second embodiment of the present disclosure will be described.

The electric power supply system software according to the second embodiment of the present disclosure causes a control apparatus to realize a pairing information generating function and a pairing information transmitting function, and causes an electric power supply apparatus provided in an electric power supply space to realize a pairing information recording function, a pairing information receiving function, and an electric power supply function.

The electric power supply system software according to the second embodiment of the present disclosure may cause the control apparatus to realize the pairing information generating function, the pairing information transmitting function, and an object moving function, and cause the electric power supply apparatus provided in the electric power supply space to realize the pairing information recording function, the pairing information receiving function, and the electric power supply function.

The electric power supply system software according to the second embodiment of the present disclosure may cause the control apparatus to realize the pairing information generating function, the pairing information transmitting function, and an object moving function, and cause the electric power supply apparatus provided in the electric power supply space to realize the pairing information recording function, the pairing information receiving function, and the electric power supply function.

The control apparatus is an apparatus that can control an electric power supply system.

The electric power supply apparatus is an apparatus that can supply electric power to an object located in the electric power supply space.

The pairing information generating function is a function to generate, upon receiving an electric power supply request, specific pairing information that is pairing information.

The control apparatus generates, upon receiving the electric power supply request, the specific pairing information that is the pairing information.

The pairing information transmitting function is a function to transmit the specific pairing information to each of the electric power supply apparatus provided in the electric power supply space and an object that has output the electric power supply request.

The control apparatus transmits the specific pairing information to each of the electric power supply apparatus provided in the electric power supply space and the object that has output the electric power supply request.

The object records the specific pairing information.

The object moving function is a function to move the object to the electric power supply space.

For example, the control apparatus controls a moving apparatus to move the object to the electric power supply space.

The object moving function is a function to allow the object to move to the electric power supply space.

For example, the control apparatus designates the electric power supply space, and the object is moved to the electric power supply space by another means.

The pairing information recording function is a function to record the transmitted specific pairing information.

The electric power supply apparatus records the transmitted specific pairing information.

For example, the electric power supply apparatus records the specific pairing information transmitted from the control apparatus.

The pairing information receiving function is a function to receive the pairing information from the object by communicating with the object located in the electric power supply space.

The object located in the electric power supply space attempts to communicate with the electric power supply apparatus.

The electric power supply apparatus receives the pairing information from the object by communicating with the object located in the electric power supply space.

The electric power supply function is a function to supply electric power to the object located in the electric power supply space when the received pairing information coincides with the specific pairing information recorded in the electric power supply apparatus.

The electric power supply apparatus supplies electric power to the object located in the electric power supply space when the received pairing information coincides with the specific pairing information recorded in the electric power supply apparatus.

For example, the electric power supply apparatus does not supply electric power to the object located in the electric power supply space when the received pairing information does not coincide with the specific pairing information recorded in the electric power supply apparatus.

For example, the electric power supply apparatus does not supply electric power to the object located in the electric power supply space when the pairing information is not received.

Next, an electric power supply device according to an embodiment of the present disclosure will be described.

The electric power supply device according to the embodiment of the present disclosure is an apparatus that supplies electric power to an object capable of receiving electric power supply.

The electric power supply device according to the embodiment of the present disclosure is an apparatus that supplies electric power wirelessly to an object capable of receiving electric power supply.

Since the configuration of the wireless power transfer is the same as that mentioned above, the description will be omitted.

An electric power supply device according to the first embodiment of the present disclosure includes a plurality of electric power supply spaces and an electric power supply apparatus.

The electric power supply device according to the first embodiment of the present disclosure may include the plurality of electric power supply spaces and a plurality of electric power supply apparatuses.

The electric power supply space is a space in which an object is located at the time of electric power supply.

The electric power supply apparatus is an electric apparatus that can supply electric power to the object located in the electric power supply space.

The electric power supply apparatus may be provided in at least one of the plurality of electric power supply spaces.

The electric power supply device executes a pairing information generating step, a pairing information transmitting step, a pairing information receiving step, and an electric power supply step.

The electric power supply device may execute the pairing information generating step, the pairing information transmitting step, an object moving step, the pairing information receiving step, and the electric power supply step.

The electric power supply device may execute the pairing information generating step, the pairing information transmitting step, an object moving step, the pairing information receiving step, and the electric power supply step.

The pairing information generating step is a step of selecting, when receiving an electric power supply request, a specific electric power supply space that is a particular electric power supply space from among the plurality of electric power supply spaces to generate specific pairing information that is pairing information associated with the specific electric power supply space.

The electric power supply device selects, when receiving the electric power supply request, the specific electric power supply space that is the particular electric power supply space from among the plurality of electric power supply spaces to generate the specific pairing information that is the pairing information associated with the specific electric power supply space.

The pairing information transmitting step is a step of transmitting the specific pairing information to an object that has output the electric power supply request.

The electric power supply device transmits the specific pairing information to the object that has output the electric power supply request.

The object moving step is a step of moving the object to the specific electric power supply space.

For example, the electric power supply device moves the object to the specific electric power supply space.

The object moving step is a step of allowing the object to move to the specific electric power supply space.

For example, the electric power supply device designates the electric power supply space, and the object is moved to the specific electric power supply space by another means.

The pairing information receiving step is a step of communicating with the object located in the specific electric power supply space to receive the pairing information from the object.

The electric power supply device receives the pairing information from the object by communicating with the object located in the specific electric power supply space.

The electric power supply step is a step of supplying electric power to the object located in the specific electric power supply space when the received pairing information coincides with the specific pairing information associated with the specific electric power supply space.

The electric power supply step may be a step of supplying, from the electric power supply apparatus provided in the specific electric power supply space, electric power to the object located in the specific electric power supply space when the received pairing information coincides with the specific pairing information associated with the specific electric power supply space.

The electric power supply device is configured such that the electric power supply apparatus provided in the specific electric power supply space supplies electric power to the object located in the specific electric power supply space when the received pairing information coincides with the specific pairing information associated with the specific electric power supply space.

For example, the electric power supply device is configured such that the electric power supply apparatus provided in the specific electric power supply space does not supply electric power to the object located in the specific electric power supply space when the received pairing information does not coincide with the specific pairing information associated with the specific electric power supply space.

For example, the electric power supply device is configured such that the electric power supply apparatus provided in the electric power supply space does not supply electric power to the object located in the electric power supply space when the pairing information is not received.

An electric power supply device according to the second embodiment of the present disclosure includes a plurality of electric power supply spaces and an electric power supply apparatus.

The electric power supply space is a space in which an object is located at the time of electric power supply.

The electric power supply apparatus is an electric apparatus that can supply electric power to the object located in the electric power supply space.

The electric power supply apparatus may be provided in at least one of the plurality of electric power supply spaces.

The electric power supply device executes a pairing information generating step, a pairing information transmitting step, a pairing information recording step, a pairing information receiving step, and an electric power supply step.

The electric power supply device may execute the pairing information generating step, the pairing information transmitting step, an object moving step, the pairing information recording step, the pairing information receiving step, and the electric power supply step.

The electric power supply device may execute the pairing information generating step, the pairing information transmitting step, an object moving step, the pairing information recording step, the pairing information receiving step, and the electric power supply step.

The pairing information generating step is a step of selecting, upon receiving an electric power supply request, a specific electric power supply space that is a particular electric power supply space from among the plurality of electric power supply spaces to generate pairing information associated with the specific electric power supply space.

The electric power supply device selects, upon receiving the electric power supply request, the specific electric power supply space that is the particular electric power supply space from among the plurality of electric power supply spaces to generate the pairing information associated with the specific electric power supply space.

The pairing information transmitting step is a step of transmitting the pairing information to each of the electric power supply apparatus provided in the specific electric power supply space and an object that has output the electric power supply request.

The electric power supply device transmits the pairing information to each of the electric power supply apparatus provided in the specific electric power supply space and the object that has output the electric power supply request.

The object moving step is a step of moving the object to the specific electric power supply space.

For example, the electric power supply device moves the object to the specific electric power supply space.

The object moving step is a step of allowing the object to move to the specific electric power supply space.

For example, the electric power supply device designates the electric power supply space, and the object is moved to the specific electric power supply space by another means.

The pairing information recording step is a step of recording, by the electric power supply apparatus provided in the specific electric power supply space, transmitted specific pairing information.

The electric power supply apparatus provided in the specific electric power supply space records the transmitted specific pairing information.

The pairing information receiving step is a step of communicating, by the electric power supply apparatus provided in the specific electric power supply space, with the object located in the specific electric power supply space to receive, by the electric power supply apparatus provided in the specific electric power supply space, the pairing information from the object.

It is a step of communicating, by the electric power supply apparatus provided in the specific electric power supply space, with the object located in the specific electric power supply space to receive, by the electric power supply apparatus provided in the specific electric power supply space, the pairing information from the object.

The electric power supply step is an act of supplying, from the electric power supply apparatus provided in the specific electric power supply space, electric power to the object located in the specific electric power supply space when the received pairing information coincides with the specific pairing information recorded in the electric power supply apparatus provided in the specific electric power supply space.

The electric power supply apparatus provided in the specific electric power supply space supplies electric power to the object located in the specific electric power supply space when the received pairing information coincides with the specific pairing information recorded in the electric power supply apparatus provided in the specific electric power supply space.

For example, the electric power supply apparatus provided in the specific electric power supply space does not supply electric power to the object located in the specific electric power supply space when the received pairing information does not coincide with the specific pairing information recorded in the electric power supply apparatus provided in the specific electric power supply space.

For example, the electric power supply apparatus provided in the electric power supply space does not supply electric power to the object located in the electric power supply space when the pairing information is not received.

Next, a parking device program according to an embodiment of the present disclosure will be described.

The parking device program according to the embodiment of the present disclosure is a program for a parking device that supplies electric power to a vehicle that has entered a parking space and is capable of receiving electric power supply.

The parking device program according to the embodiment of the present disclosure may be a program for a parking device that supplies electric power wirelessly to a vehicle that has entered a parking space and is capable of receiving electric power supply.

The parking device program is stored in a computer-readable medium and executed by a control apparatus provided in the parking device (electric power supply device). The computer-readable medium is inserted into the control apparatus that is a computer, and a processor of the control apparatus accesses the parking device program. Alternatively, the parking device program is stored in a program storage area formed in a storage medium provided in the control apparatus.

Hereinafter, an example of the parking device will be described.

The parking device includes a parking mechanism 10, a power source apparatus 20, the control apparatus 70, and the electric power supply apparatus 110.

The parking mechanism 10 includes a plurality of parking spaces 11, a vehicle moving apparatus 12, and a three-phase motor 13.

For example, the parking mechanism 10 includes the plurality of parking spaces 11, the vehicle moving apparatus 12, the three-phase motor 13, a plurality of pallets 14, and an entry/exit space 15.

The parking space 11 is a space in which a vehicle 5 is parked.

The electric power receiving apparatus 120 is incorporated in the vehicle 5.

For example, the plurality of parking spaces 11 is aligned at predetermined intervals in a vertical direction.

For example, the plurality of parking spaces 11 is stacked up into multiple stages along a hoisting space H which will be described later.

The vehicle moving apparatus 12 is an apparatus that can move the vehicle to the parking space.

For example, the vehicle moving apparatus 12 moves the vehicle 5 between the entry/exit space 15 and the parking space 11.

For example, the vehicle moving apparatus 12 hoists and lowers, within the hoisting space H, the pallet 14 on which the vehicle 5 has been placed, and moves between the parking space 11 and the entry/exit space 15.

The three-phase motor 13 is a motor that actuates the vehicle moving apparatus.

A rotation speed of the three-phase motor 13 is controlled by the control apparatus 70 which will be described later.

Once the rotation speed of the three-phase motor 13 is controlled, a speed of the vehicle moving apparatus 12 is controlled.

The pallet 14 is a board structure having a substantially rectangular shape when viewed from above. The vehicle 5 is placed on the pallet 14.

The entry/exit space 15 is a space for the vehicle to enter and exit from a parking lot.

For example, the entry/exit space 15 is provided below the hoisting space H.

The power source apparatus 20 supplies electric power to the parking mechanism 10, the control apparatus 70, and the electric power supply apparatus 110.

The control apparatus 70 is an apparatus that can control the parking device.

The electric power supply apparatus 110 is an apparatus that can supply electric power to the vehicle 5 located in the parking space 11.

The plurality of electric power supply apparatuses 110 is provided in the respective plurality of parking spaces 11.

A parking device program according to the first embodiment of the present disclosure causes a control apparatus to realize a parking space selecting function, a pairing information generating function, a pairing information transmitting function, a pairing information receiving function, and an electric power supply function.

The parking device program according to the first embodiment of the present disclosure may cause the control apparatus to realize the parking space selecting function, the pairing information generating function, the pairing information transmitting function, a vehicle moving function, the pairing information receiving function, and the electric power supply function.

The parking device program according to the first embodiment of the present disclosure causes the control apparatus to realize the parking space selecting function, the pairing information generating function, the pairing information transmitting function, the vehicle moving function, the pairing information receiving function, and the electric power supply function.

The control apparatus is an apparatus that can control a parking device.

The parking space selecting function is a function to select, when receiving a parking request, a specific parking space that is a particular parking space from among a plurality of parking spaces.

The control apparatus selects, upon receiving the parking request from a vehicle located at a home position, the specific parking space that is the particular parking space from among the plurality of parking spaces.

The pairing information generating function is a function to generate, when receiving an electric power supply request, specific pairing information that is pairing information associated with the specific parking space.

The control apparatus generates the specific pairing information upon receiving the electric power supply request from the vehicle located at the home position.

The specific pairing information is an information code associated with the specific parking space.

The pairing information transmitting function is a function to transmit the specific pairing information to the vehicle that has output the electric power supply request.

The control apparatus transmits the specific pairing information to the vehicle located at the home position.

The vehicle stores the transmitted specific pairing information.

The vehicle moving function is a function to move the vehicle to the specific parking space.

For example, the control apparatus controls a parking mechanism to move the vehicle to the specific parking space.

The vehicle parking function is a function to allow the vehicle to move to the specific parking space.

For example, the control apparatus designates the specific parking space, and the vehicle runs by itself to enter the specific parking space and stops.

The pairing information receiving function is a function to receive the pairing information from the vehicle by communicating with the vehicle parked in the specific parking space.

For example, the vehicle located in the specific parking space attempts to communicate.

The control apparatus receives the pairing information from the vehicle by communicating with the vehicle parked in the specific parking space.

The electric power supply function is a function to supply electric power to the vehicle parked in the specific parking space when the received pairing information coincides with the specific pairing information associated with the specific parking space.

The control apparatus supplies electric power to the vehicle parked in the specific parking space when the received pairing information coincides with the specific pairing information associated with the specific parking space.

The control apparatus does not supply electric power to the vehicle parked in the specific parking space when the received pairing information does not coincide with the specific pairing information associated with the specific parking space.

Next, a parking device program according to the second embodiment of the present disclosure causes a control apparatus to realize a parking space selecting function, a pairing information generating function, and a pairing information transmitting function, and causes an electric power supply apparatus provided in a parking space to realize a pairing information recording function, a pairing information receiving function, and an electric power supply function.

The parking device program according to the second embodiment of the present disclosure may cause the control apparatus to realize the parking space selecting function, the pairing information generating function, the pairing information transmitting function, and a vehicle moving function, and cause the electric power supply apparatus provided in the parking space to realize the pairing information recording function, the pairing information receiving function, and the electric power supply function.

The parking device program according to the second embodiment of the present disclosure may cause the control apparatus to realize the parking space selecting function, the pairing information generating function, the pairing information transmitting function, and a vehicle moving function, and cause the electric power supply apparatus provided in the parking space to realize the pairing information recording function, the pairing information receiving function, and the electric power supply function.

The parking space selecting function is a function to select, upon receiving a parking request, a specific parking space that is a particular parking space from among a plurality of parking spaces.

For example, a vehicle is located at a home position.

The control apparatus selects, upon receiving the parking request from the vehicle, the specific parking space that is the particular parking space from among the plurality of parking spaces.

The pairing information generating function is a function to generate, upon receiving an electric power supply request, specific pairing information that is pairing information associated with the specific parking space.

For example, the vehicle is located at the home position.

The control apparatus generates the specific pairing information upon receiving the electric power supply request from the vehicle.

The specific pairing information is the pairing information associated with the specific parking space.

The pairing information transmitting function is a function to transmit the specific pairing information to each of the electric power supply apparatus provided in the specific parking space and the vehicle that has output the electric power supply request.

The control apparatus transmits the specific pairing information to each of the electric power supply apparatus provided in the specific parking space and the vehicle that has output the electric power supply request.

For example, the vehicle records the specific pairing information.

For example, an electric power receiving apparatus incorporated in the vehicle records the specific pairing information.

The vehicle moving function is a function to move the vehicle to the specific parking space.

The control apparatus controls a parking mechanism to move the vehicle to the specific parking space.

The vehicle moving function is a function to allow the vehicle to move to the specific parking space.

The control apparatus designates the specific parking space, and the vehicle runs by itself to enter the specific parking space and stops.

The pairing information recording function is a function to record the transmitted specific pairing information.

The electric power supply apparatus records the transmitted specific pairing information.

The pairing information receiving function is a function to receive the pairing information from the vehicle by communicating with the vehicle parked in the parking space.

For example, the vehicle parked in the parking space attempts to communicate with the electric power supply apparatus provided in the parking space.

The electric power supply apparatus provided in the parking space receives the pairing information from the vehicle by communicating with the vehicle parked in the parking space.

The electric power supply function is a function to supply, from the electric power supply apparatus provided in the specific parking space, electric power to the vehicle parked in the specific parking space when the received pairing information coincides with the specific pairing information recorded in the electric power supply apparatus.

The electric power supply apparatus provided in the specific parking space supplies electric power to the vehicle parked in the specific parking space when the received pairing information coincides with the specific pairing information recorded in the electric power supply apparatus.

For example, the electric power supply apparatus provided in the specific parking space does not supply electric power to the vehicle parked in the specific parking space when the received pairing information does not coincide with the specific pairing information recorded in the electric power supply apparatus.

For example, the electric power supply apparatus provided in the specific parking space does not supply electric power to the vehicle parked in the specific parking space when the pairing information is not received.

Next, a parking device according to an embodiment of the present disclosure will be described.

The parking device according to the embodiment of the present disclosure is a device that causes a vehicle capable of receiving electric power supply to be parked.

The parking device according to the embodiment of the present disclosure is a device that causes a vehicle capable of receiving wireless power transfer to be parked.

A parking device according to the first embodiment of the present disclosure includes a plurality of parking spaces and an electric power supply apparatus.

The parking space is a space in which a vehicle is parked.

The electric power supply apparatus is an apparatus that can supply electric power to the vehicle located in the parking space.

The electric power supply apparatus may be provided in at least one parking space of the plurality of parking spaces.

A plurality of electric power supply apparatuses may be provided in the respective plurality of parking spaces.

The parking device according to the first embodiment of the present disclosure executes a parking space selecting step, a pairing information generating step, a pairing information transmitting step, a pairing information receiving step, and an electric power supply step.

The parking device according to the first embodiment of the present disclosure may execute the parking space selecting step, the pairing information generating step, the pairing information transmitting step, a vehicle moving step, the pairing information receiving step, and the electric power supply step.

The parking device according to the first embodiment of the present disclosure may execute the parking space selecting step, the pairing information generating step, the pairing information transmitting step, a vehicle moving step, the pairing information receiving step, and the electric power supply step.

The parking space selecting step is a step of selecting, when receiving a parking request, a specific parking space that is a particular parking space from among the plurality of parking spaces.

For example, a vehicle is located at a home position.

The parking device selects, when receiving the parking request from the vehicle, the specific parking space that is the particular parking space from among the plurality of parking spaces.

The pairing information generating step is a step of generating, when receiving an electric power supply request, specific pairing information that is pairing information associated with the specific parking space.

The pairing information generating step may be a step of generating, when receiving the electric power supply request together with the parking request, the specific pairing information that is the pairing information associated with the specific parking space.

For example, the vehicle is located at the home position.

The parking device generates the specific pairing information when receiving the electric power supply request from the vehicle.

The specific pairing information is the pairing information associated with the specific parking space.

The pairing information transmitting step is a step of transmitting the specific pairing information to the vehicle that has output the electric power supply request.

For example, the vehicle is located at the home position.

The parking device transmits the specific pairing information to the vehicle that has output the electric power supply request.

The vehicle moving step is a step of moving the vehicle to the specific parking space.

The parking device moves the vehicle to the specific parking space.

The vehicle moving step is a step of allowing the vehicle to move to the specific parking space.

The parking device designates the specific parking space, and the vehicle runs by itself to enter the specific parking space and stops.

The pairing information receiving step is a step of communicating with the vehicle parked in the specific parking space to receive the pairing information from the vehicle.

For example, the vehicle parked in the specific parking space attempts to communicate with the parking device.

The parking device receives the pairing information from the vehicle by communicating with the vehicle parked in the specific parking space.

The electric power supply step is a step of supplying, from the electric power supply apparatus, electric power to the vehicle parked in the specific parking space when the received pairing information coincides with the specific pairing information associated with the specific parking space.

The electric power supply step may be a step of supplying, from the electric power supply apparatus provided in the specific parking space, electric power to the vehicle parked in the specific parking space when the received pairing information coincides with the specific pairing information associated with the specific parking space.

The parking device is configured such that the electric power supply apparatus provided in the specific parking space supplies electric power to the vehicle parked in the specific parking space when the received pairing information coincides with the specific pairing information associated with the specific parking space.

For example, the parking device is configured such that the electric power supply apparatus provided in the specific parking space does not supply electric power to the vehicle parked in the specific parking space when the received pairing information does not coincide with the specific pairing information associated with the specific parking space.

For example, the parking device is configured such that the electric power supply apparatus provided in the specific parking space does not supply electric power to the vehicle parked in the specific parking space when the pairing information is not received.

Next, a parking device according to the second embodiment of the present disclosure includes a plurality of parking spaces and an electric power supply apparatus.

The parking space is a space in which a vehicle is parked.

The electric power supply apparatus is an apparatus that can supply electric power to the vehicle parked in the parking space.

The electric power supply apparatus may be provided in at least one parking space of the plurality of parking spaces.

The parking device according to the second embodiment of the present disclosure executes a parking space selecting step, a pairing information generating step, a pairing information transmitting step, a pairing information recording step, a pairing information receiving step, and an electric power supply step.

The parking device according to the second embodiment of the present disclosure may execute the parking space selecting step, the pairing information generating step, the pairing information transmitting step, a vehicle moving step, the pairing information recording step, the pairing information receiving step, and the electric power supply step.

The parking device according to the second embodiment of the present disclosure may execute the parking space selecting step, the pairing information generating step, the pairing information transmitting step, a vehicle moving step, the pairing information recording step, the pairing information receiving step, and the electric power supply step.

The parking space selecting step is a step of selecting, upon receiving a parking request, a specific parking space that is a particular parking space from among the plurality of parking spaces.

The pairing information generating step is a step of generating, upon receiving an electric power supply request together with the parking request, pairing information associated with the specific parking space.

The pairing information generating step may be a step of generating, upon receiving the electric power supply request together with the parking request, pairing information associated with the specific parking space.

The pairing information transmitting step is a step of transmitting the pairing information to each of the electric power supply apparatus provided in the specific parking space and a vehicle that has output the electric power supply request.

The vehicle that has output the electric power supply request records the received pairing information.

For example, an electric power supply apparatus incorporated in the vehicle that has output the electric power supply request records the received pairing information.

The vehicle moving step is a step of moving the vehicle to the specific parking space.

The vehicle is moved to the specific parking space by a moving apparatus.

The vehicle moving step is a step of allowing the vehicle to move to the specific parking space.

The vehicle runs by itself to move to the designated specific parking space.

The pairing information recording step is a step of recording, by the electric power supply apparatus provided in the specific parking space, transmitted specific pairing information.

The electric power supply apparatus provided in the specific parking space records the transmitted specific pairing information.

The pairing information receiving step is a step of communicating, by the electric power supply apparatus provided in the specific parking space, with the vehicle parked in the specific parking space to receive, by the electric power supply apparatus provided in the specific parking space, the pairing information from the vehicle.

For example, the vehicle parked in the parking space attempts to communicate with the electric power supply apparatus provided in the parking space.

The vehicle parked in the specific parking space and the electric power supply apparatus provided in the specific parking space communicate with each other, and the electric power supply apparatus provided in the specific parking space receives the pairing information from the vehicle.

The electric power supply step is a step of supplying, from the electric power supply apparatus provided in the specific parking space, electric power to the vehicle parked in the specific parking space when the received pairing information coincides with the specific pairing information recorded in the electric power supply apparatus provided in the specific parking space.

The electric power supply apparatus provided in the specific parking space supplies electric power to the vehicle parked in the specific parking space when the received pairing information coincides with the specific pairing information recorded in the electric power supply apparatus provided in the specific parking space.

For example, the electric power supply apparatus provided in the specific parking space does not supply electric power to the vehicle parked in the specific parking space when the received pairing information does not coincide with the specific pairing information recorded in the electric power supply apparatus provided in the specific parking space.

For example, the electric power supply apparatus provided in the specific parking space does not supply electric power to the vehicle parked in the specific parking space when the pairing information is not received.

Operation of the parking device and parking device software according to an embodiment of the present disclosure will be described based on the drawings.

Figure 3:
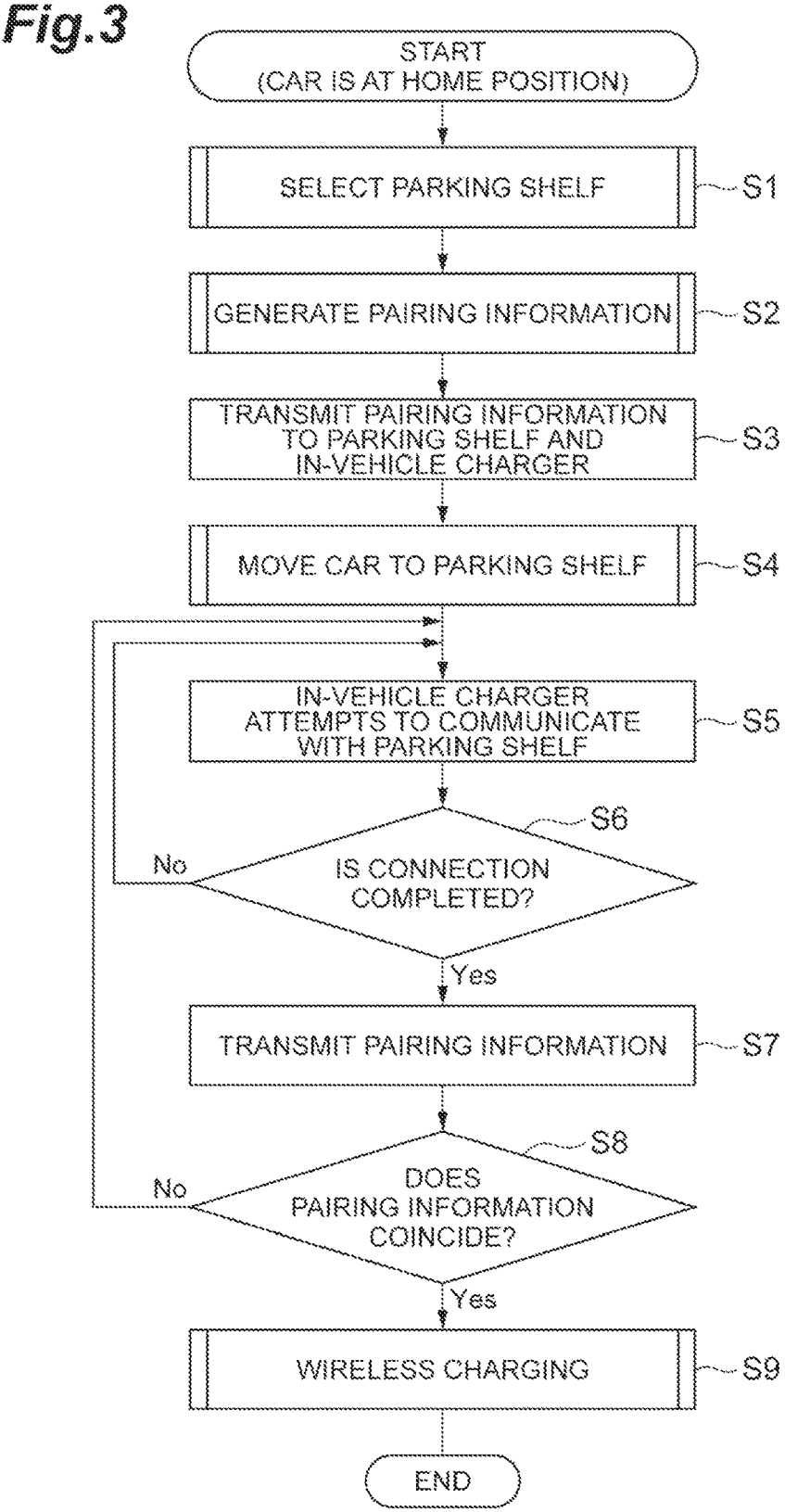
FIG. 3 is a procedure explanation diagram of the parking device according to the embodiment of the present disclosure.

FIG. 3 is a diagram illustrating a procedure of the parking device and the parking device software according to the embodiment of the present disclosure.

Figure 4:
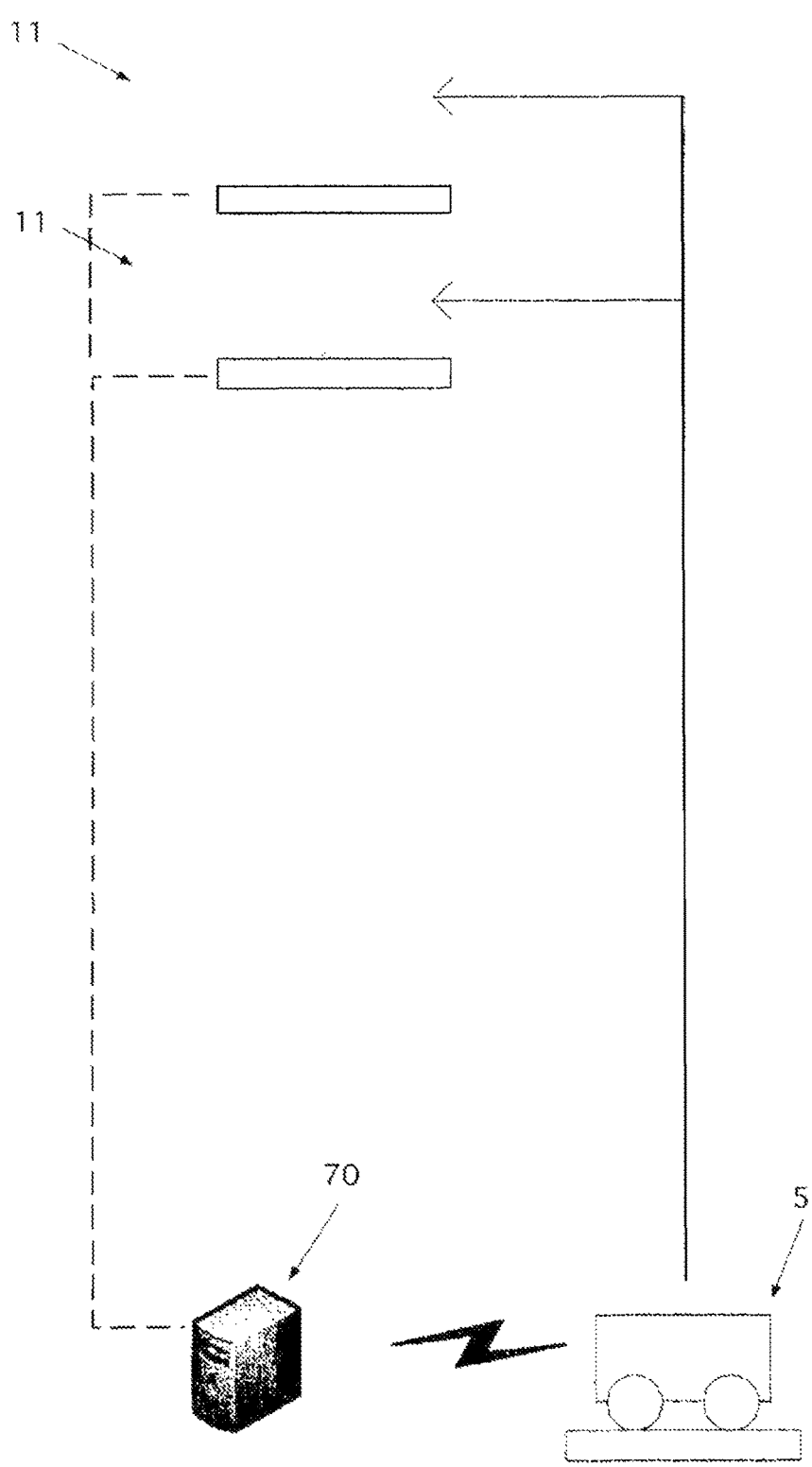
FIG. 4 is an operation explanation diagram of the parking device according to the embodiment of the present disclosure.

FIG. 4 is a diagram illustrating the operation of the parking device and the parking device software according to the embodiment of the present disclosure.

(Start)
The vehicle is located at the home position and outputs the parking request and the electric power supply request.

For example, a driver of the vehicle outputs the parking request and the electric power supply request.

The home position may be a position where the vehicle is located at the entry/exit space of the parking device.

The home position may be a gate of a parking lot.

(Select parking shelf)
The parking space selecting step is executed to select a parking shelf in which the vehicle is parked (step S01).

(Generate pairing information)
The pairing information generating step is executed to generate the pairing information (step S02).

The pairing information is identification information provided to the vehicle that has output the electric power supply request so that the vehicle that has output the electric power supply request can be identified.

(Transmit pairing information to parking shelf and in-vehicle charger)
The pairing information transmitting step is executed to transmit the pairing information to the parking shelf and an in-vehicle charger mounted on the vehicle (step S03).

The parking shelf records the pairing information.
The in-vehicle charger records the pairing information.

(Move car to parking shelf)
The vehicle moving step is executed, and the moving apparatus moves the car to the selected parking shelf (step S04).

(In-vehicle charger attempts to communicate with parking shelf)
The pairing information receiving step is attempted to be executed (step S05).

(Transmit pairing information)
When the connection is completed (step S06; Yes), the pairing information is transmitted (step S07).

The pairing information receiving step is executed, and the parking shelf receives the pairing information from the car placed on the parking shelf.

(Wireless charging)
When the pairing information coincides (step S08; Yes), wireless charging is started (step S09).

When the electric power supply step is executed, and the received pairing information coincides with the recorded specific pairing information, electric power is supplied from the parking shelf to the car located at the parking shelf, and the car is charged with the supplied electric power.

The electric power supply system program according to the embodiment of the present disclosure has the following effects owing to its configuration.

Such a configuration has been employed as to: generate specific pairing information upon receiving an electric power supply request; transmit the specific pairing information to an object that has output the electric power supply request; receive pairing information from the object located in an electric power supply space; and supply electric power to the object located in the electric power supply space when the pairing information coincides with the specific pairing information. Therefore, electric power can be supplied, in the electric power supply space, to the object that has made the electric power supply request.

Such a configuration has been employed as to: generate specific pairing information upon receiving an electric power supply request; transmit the specific pairing information to an object that has output the electric power supply request and an electric power supply apparatus provided in an electric power supply space; receive pairing information from the object located in the electric power supply space; and supply, from the electric power supply apparatus provided in the electric power supply space, electric power to the object located in the electric power supply space when the pairing information coincides with the specific pairing information. Therefore, electric power can be supplied, in the electric power supply space, to a vehicle that has made the electric power supply request.

The electric power supply device according to the embodiment of the present disclosure has the following effects owing to its configuration.

Such a configuration has been employed as to: select a specific electric power supply space upon receiving an electric power supply request to generate specific pairing information; transmit the specific pairing information to an object that has output the electric power supply request; receive pairing information from the object located in the specific electric power supply space; and supply electric power to the object located in the specific electric power supply space when the pairing information coincides with the specific pairing information. Therefore, electric power can be supplied, in a particular electric power supply space, to the object that has made the electric power supply request.

Such a configuration has been employed as to: select a specific electric power supply space upon receiving an electric power supply request to generate specific pairing information; transmit the specific pairing information to an object that has output the electric power supply request and an electric power supply apparatus provided in an electric power supply space; receive pairing information from the object located in the specific electric power supply space; and supply, from the electric power supply apparatus provided in the specific electric power supply space, electric power to the object located in the specific electric power supply space when the pairing information coincides with the specific pairing information. Therefore, electric power can be supplied, in the specific electric power supply space, to the object that has made the electric power supply request.

The parking device program according to the embodiment of the present disclosure has the following effects owing to its configuration.

Such a configuration has been employed as to: select a specific parking space when receiving a parking request; generate specific pairing information upon receiving an electric power supply request; transmit the specific pairing information to a vehicle that has output the electric power supply request; receive pairing information from the vehicle located in the specific parking space; and supply electric power to the vehicle located in the specific parking space when the pairing information coincides with the specific pairing information. Therefore, electric power can be supplied, in a particular electric power supply space, to the vehicle that has made the electric power supply request.

Such a configuration has been employed as to: select a specific parking space upon receiving a parking request; generate specific pairing information upon receiving an electric power supply request; transmit the specific pairing information to an object that has output the electric power supply request and an electric power supply apparatus provided in the specific parking space; receive pairing information from the object located in the specific parking space; and supply, from the electric power supply apparatus provided in the specific parking space, electric power to the object located in the specific parking space when the pairing information coincides with the specific pairing information. Therefore, electric power can be supplied, in a particular electric power supply space, to a vehicle that has made the electric power supply request.

The parking device according to the embodiment of the present disclosure has the following effects owing to its configuration.

Such a configuration has been employed as to: select a specific parking space when receiving a parking request; generate specific pairing information upon receiving an electric power supply request; transmit the specific pairing information to a vehicle that has output the electric power supply request; receive pairing information from the vehicle located in the specific parking space; and supply electric power to the vehicle located in the specific parking space when the pairing information coincides with the specific pairing information. Therefore, electric power can be supplied, in a particular electric power supply space, to the vehicle that has made the electric power supply request.

Such a configuration has been employed as to: select a specific parking space when receiving a parking request; generate specific pairing information upon receiving an electric power supply request; transmit the specific pairing information to a vehicle that has output the electric power supply request and an electric power supply apparatus provided in the specific parking space; receive pairing information from the vehicle located in the specific parking space; and supply, from the electric power supply apparatus provided in the specific parking space, electric power to the vehicle located in the specific parking space when the pairing information coincides with the specific pairing information. Therefore, electric power can be supplied, in an electric power supply space, to the vehicle that has made the electric power supply request.

The present disclosure is not limited to the above-mentioned embodiments, and can be variously changed in a range not deviating from the gist of the disclosure.

Although an exemplary case where the vehicle is the object has been described, the present disclosure is not limited to this exemplary case. For example, the object may be an electric apparatus capable of receiving electric power supply.

Figure 5A:
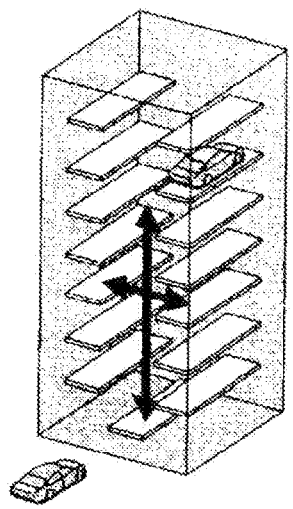
FIGS. 5A to 5G are variations of the parking device.
Figure 5B:
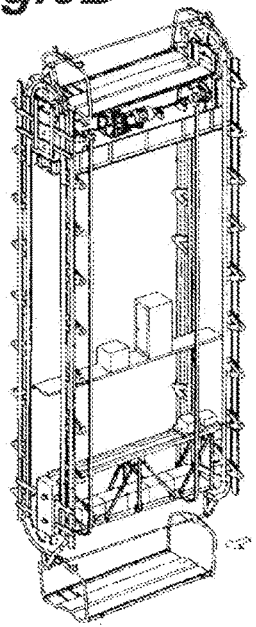
Figure 5C:
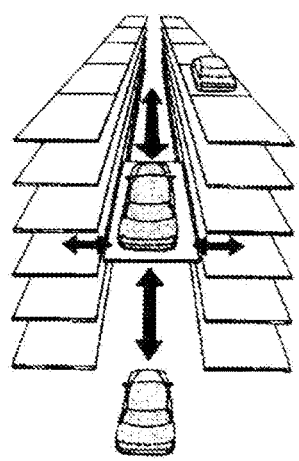
Figure 5D:
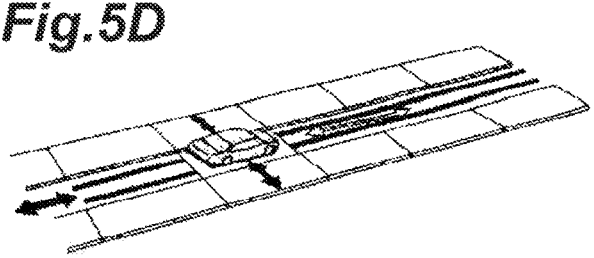
Figure 5E:
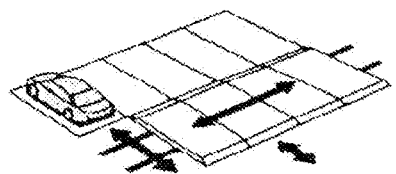
Figure 5F:
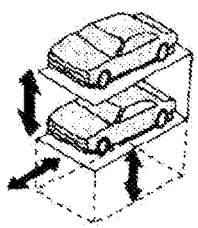
Figure 5G:
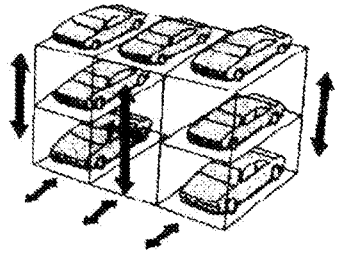

Although an exemplary case where a moving mechanism of the parking device is configured to be an elevator parking device (refer to FIG. 5A) has been described, the present disclosure is not limited to this exemplary case. For example, a circulating mechanism may be employed, examples of which include a box-shaped circulation parking device, a horizontal circulation parking device, a merry-go-round parking device (refer to FIG. 5B), an elevator sliding parking device (refer to FIG. 5C), a plane reciprocation parking device (refer to FIG. 5D), a conveying storage parking device (refer to FIG. 5E), and a two-stage/multiple-stage parking device (for example, two stages on a pit as illustrated in FIG. 5F or three stages on the ground as illustrated in FIG. 5G).

INDUSTRIAL APPLICABILITY

According to some aspects of the present disclosure, electric power can be appropriately supplied using a simple structure.

REFERENCE SIGNS LIST

H hoisting space
5 vehicle
10 parking mechanism
11 parking space
12 vehicle moving apparatus
13 three-phase motor
14 pallet
15 entry/exit space
20 power source apparatus
70 control apparatus
100 wireless power transfer system
110 electric power supply apparatus
111 electric power supply primary coil
112 drive circuit
120 electric power receiving apparatus
121 electric power supply secondary coil
122 load

The invention claimed is:
1. An electric power supply device that supplies electric power to at least one of a plurality of objects capable of receiving electric power supply, the electric power supply device comprising:
a plurality of electric power supply spaces, each electric power supply space being a space in which an object is located at the time of electric power supply; and
an electric power supply apparatus configured to supply electric power to the object located in the electric power supply space, wherein
the electric power supply device is configured to:
select, when receiving an electric power supply request from one of the plurality of objects, an electric power supply space from the plurality of electric power supply spaces;
generate pairing information associated with the selected electric power supply space;
transmit the pairing information to the one object that has output the electric power supply request;

receive the pairing information from the one object by communicating with the object located in the selected electric power supply space; and supply, from the electric power supply apparatus, electric power to the one object located in the selected electric power supply space when the received pairing information coincides with the generated pairing information associated with the selected electric power supply space.

2. An electric power supply device that supplies electric power to at least one of a plurality of objects configured to receive electric power supply, the electric power supply device comprising:

a plurality of electric power supply spaces, each electric power supply space being a space in which an object is located at the time of electric power supply; and an electric power supply apparatus provided in at least one electric power supply space of the plurality of electric power supply spaces, the electric power supply apparatus configured to supply electric power to the object located in the electric power supply space, wherein the electric power supply device is configured to:

select, upon receiving an electric power supply request from one of the plurality of objects, an electric power supply space from the plurality of electric power supply spaces;

generate pairing information associated with the specific electric power supply space;

transmit the pairing information to each of the electric power supply apparatus provided in the specific electric power supply space and an object that has output the electric power supply request;

record, by the electric power supply apparatus provided in the specific electric power supply space, transmitted specific pairing information;

communicate, by the electric power supply apparatus provided in the specific electric power supply space, with the object located in the specific electric power supply space to receive, by the electric power supply apparatus provided in the specific electric power supply space, the pairing information from the object; and supply, from the electric power supply apparatus provided in the specific electric power supply space, electric power to the object located in the specific electric power supply space when the received pairing information coincides with the specific pairing information recorded in the electric power supply apparatus provided in the specific electric power supply space.

3. A parking device that allows at least one vehicle configured to receiving electric power supply to be parked, the parking device comprising:

a plurality of parking spaces each being a space in which one of a plurality of vehicles is parked; and an electric power supply apparatus configured to supply electric power to the vehicle located in the parking space, wherein the parking device is configured to:

select, when receiving a parking request from one of the vehicles, a parking space from the plurality of parking spaces;

generate, when receiving an electric power supply request, pairing information associated with the selected parking space;

transmit the pairing information to a vehicle that has output the electric power supply request;

receive the pairing information from the one vehicle parked in the parking space and communicates with the parking device; and supply, from the electric power supply apparatus, electric power to the one vehicle parked in the parking space when the received pairing information coincides with the generated pairing information associated with the specific parking space.

* * * * *